Patented Nov. 16, 1937

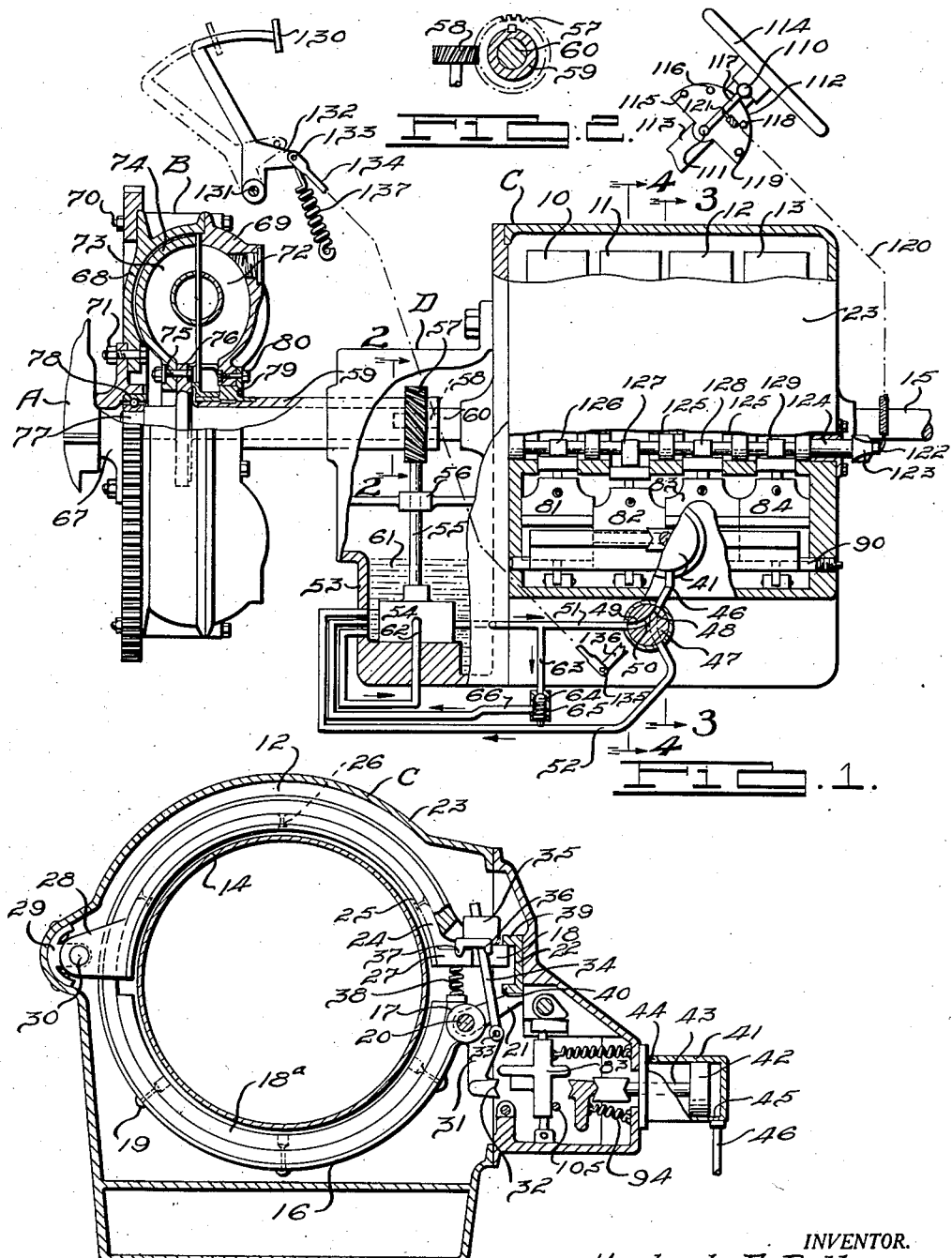

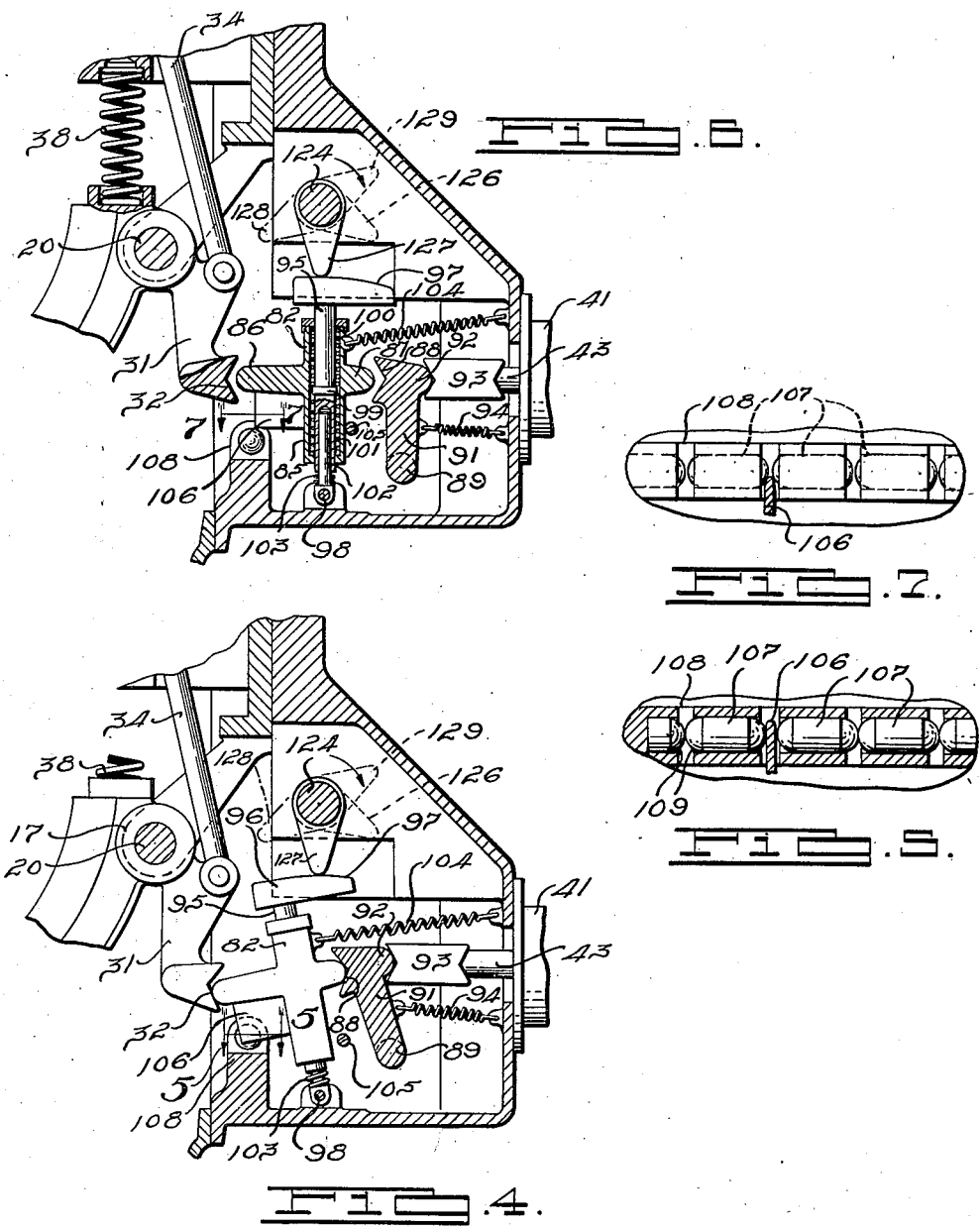

2,099,140

UNITED STATES PATENT OFFICE 2,099,140

TRANSMISSION

Herbert F. Patterson, Detroit, Mich., assignor to Chrysler Corporation, Detroit, Mich., a corporation of Delaware Application January 25, 1934, Serial No. 708,234

38 Claims. (Cl. 74—262)

This invention relates to power transmission devices and refers more particularly to improvements in power transmission devices especially adapted for use in connection with motor vehicles, although not necessarily limited thereto.

My invention, in certain more limited aspects thereof, provides improvements in the drive and control for power transmission systems of the type including the well-known epicyclic or planetary transmission gear box. With such epicyclic transmissions, it is customary to arrange the gearing to provide for the desired number of speed ratios between the engine and vehicle driving ground wheels and such gearing is customarily selected and controlled to obtain the desired ratio by actuation of any one of a group of transmission gearing controlling clutches usually consisting of reaction brake bands associated with and controlling the rotation of corresponding drums or similar elements of the various epicyclic gear trains or sets of planetary gearing.

One object of my invention resides in the provision of improvements in the braking means for establishing the reactionary rotary control for one or more of the gear sets of an epicyclic type gear box. While this feature of my invention is not necessarily limited in the application thereof to epicyclic gear boxes, it has particular significance when applied to the rotary controlling elements of such gear boxes since my invention provides for improved distribution of braking effort to the rotary drums. Difficulty has been experienced in epicyclic gear boxes in connection with objectionable tendency toward displacement of the axis of the rotary drum when the braking effort is applied thereto to obtain a driving ratio through the gear box. My invention tends to remove such difficulties by providing a braking mechanism adapted to substantially balance the braking forces circumferentially around the drum without the aforesaid tendency toward objectionable displacement of the drum axis.

A further object of my invention resides in the provision of braking means having improved efficiency, especially in connection with drums of epicyclic gear boxes; the braking means being further improved from the standpoints of simplicity, ease of service for making repairs, and ability to assemble and operate the braking mechanism within the limited space ordinarily available in gear boxes of the types referred to.

Another object of my invention resides in the provision of an improved selector and actuating mechanism for obtaining the several speed ratios provided by the transmission, speed changing mechanism or the like, the latter preferably being of the epicyclic gear type although not necessarily limited thereto in the broader aspects of my invention.

In carrying out the above objects of my invention, I have provided a common actuator or prime mover which may be of the fluid pressure type for applying the necessary force to the braking devices in order to control the rotation of the desired drum of the epicyclic gearing for example, a selector mechanism being provided under manual control of the vehicle driver for selectively causing the common actuator to apply a braking force to the proper drum.

A further object of my invention resides in the provision of improved means cooperating with the aforesaid actuator and selector mechanism for preventing improper manipulation of the speed ratio gear sets; more particularly the provision of means for preventing the actuator from applying braking effort to move, than the drum or drums which go to control any one driving speed ratio through the transmission.

Where the aforesaid common actuator for the braking devices is employed, this actuator may be of the fluid pressure type adapted for operation by oil pressure, air pressure either above or below atmospheric pressure, or by other equivalent systems. I prefer, according to the teachings of this phase of my invention, to provide for energizing the actuator by oil pressure, particularly where the vehicle driving engine transmits its power to the transmission through the intermediary of a clutch of the fluid flywheel or other type. A clutch of such form is particularly desirable in a power transmitting system employing an epicyclic gear transmission, since such combination provides for improved smoothness of vehicle drive, selectivity of speed ratios, and other characteristics recognized in the art.

With the above in mind, my invention has a further object in the provision of improvements in the arrangement and drive for a fluid pump adapted to energize one or more fluid pressure actuators for the drum braking devices of an epicyclic gear box. More particularly, I have provided an improved form of fluid flywheel clutch in which the parts thereof are so arranged that the fluid pump is driven from the clutch member which is driven with the engine rather than from the clutch member which is driven from the engine driving clutch member. By reason of such arrangement, the fluid such as oil is maintained under pressure at all times when the engine is operating even though the clutch is slipping and the driven member of the clutch is stationary as customary when, with the vehicle standing still and the engine idling, a drum of the epicyclic gear box is held stationary by its associated braking means. Other advantages of this and other features of my invention will be apparent from the following detailed description of one embodiment thereof, as shown in the accompanying drawings in which:

Fig. 1 is an elevational view partly in cross-section and somewhat diagrammatic in portions, illustrating my power transmission device.

Fig. 2 is a detail view of the gear driving arrangement for the oil pump.

Fig. 3 is a sectional elevational view through one of the epicyclic transmission controlling clutches, illustrating the actuating mechanism therefor in inoperative position, the view being taken along the line 3—3 of Fig. 1.

Fig. 4 is a detail sectional elevational view of a typical epicyclic transmission controlling clutch shown in Fig. 3, the actuating mechanism therefor being shown in operative position, the view being taken along the line 4—4 of Fig. 1.

Fig. 5 is a detail plan view of the interlocking safety mechanism, the view being taken along the line 5—5 of Fig. 4.

Fig. 6 is a view similar to Fig. 4 but showing the parts in their inoperative position.

Fig. 7 is a plan view of the interlocking safety mechanism in inoperative position, the view being taken along the line 7—7 of Fig. 6.

In the drawings, I have shown for illustrative purposes my power transmitting device or system which may include a main prime mover or engine A, a portion of which is shown in Fig. 1, a clutch or coupling B driven from the engine, and a change speed transmission or gear box C.

I have illustrated the change speed transmission C as the epicyclic or planetary type, this general form of transmission being well known in the art and, as usual, includes a plurality of controlling clutches 10, 11, 12, and 13, these clutches being adapted to act on transmission elements associated therewith and usually embodied in the form of a rotary drum, one of which is illustrated at 14 in Fig. 3 in association with the transmission controlling clutch 12. It will be understood that the various transmission controlling clutches may be adapted in the well known way for causing actuation of the respective epicyclic gear trains associated therewith, these gear trains being well known in the art and being omitted from my disclosure.

I will first describe the details of a typical transmission controlling clutch, reference being had particularly to Fig. 3 in which the clutch 12 is shown associated with the rotary drum or transmission element 14, this clutch and cooperating drum in my illustration being the control mechanism for obtaining the low speed ratio or first gear in the drive from engine A through trnsmission C to the drive shaft 15 extending therefrom for the power take off, it being understood that where the mechanism is installed in a motor vehicle that is contemplated herein, this shaft 15 is adapted in the well known manner to propel the driving ground wheels of the vehicle (not shown).

The typical clutch 12 consists of an outer band 16 which is somewhat flexible and which extends substantially circumferentially of drum 14 so as to position the ends 17 and 18 thereof adjacent each other. This band 16 has a segmental shoe 18ᵃ connected therewith by rivets 19, the segmental shoe preferably extending substantially half way around drum 14 from the end 17 of the band, this segmental shoe being formed of a suitable friction braking material for braking engagement with drum 14. The end 17 of band 16 is provided with an anchor 20 carried by a bracket 21, the latter being secured in any suitable manner to the housing 23 of transmission C. The anchor 20 may extend longitudinally of the transmission so as to be engaged by the corresponding anchor ends of the outer bands 16 associated with each of the transmission control clutches, brackets 21 being suitably spaced so as to support these anchors.

Located within the band 16 and extending from the end 18 thereof, I have provided an inner segmental band 24 likewise provided with a shoe 25 of friction material engageable with drum 14, this shoe being secured to band 24 by reason of suitable fasteners or rivets 26. The inner or segmental band 24 is preferably engaged by and within the portion of the outer band 16 adjacent the end 18 of the latter, as illustrated in Fig. 3, these parts being adapted to relatively slide during the braking or clutching action as will be more apparent hereinafter.

The inner band 24 has an end 27 positioned adjacent end 18 of the outer band, the band 24 preferably extending substantially half way around drum 14 where the segmental band is formed with one or more ears 28 adapted to pivotally anchor the inner band. Thus, the casing 23 is provided with a suitable bracket 29 adapted to support the pivotal connection 30 for the ears 28.

I have provided means for simultaneously actuating the ends 18 and 27 of the outer and inner bands respectively, this means being adapted to apply a differential force to these bands whereby the friction shoes respectively carried by the bands will exert substantially uniform pressure to the associated drum 14 without a tendency toward substantial or objectionable displacement of the axis of the drum. To this end the anchor 20 is adapted to pivotally support a toggle lever 31, this lever having a notched end 32 adapted to swing the lever about anchor 20 when the clutch is applied, as will be more apparent hereinafter. Pivotally connected at 33 to lever 31 is an arm or rod 34 carrying a block 35 provided with lugs or feet 36 and 37, respectively engaging the ends 18 and 27 of the outer and inner bands 16 and 24. It will be noted that the lug 36 is relatively close to the line of pull of rod 34 with respect to the location of the lug 37, it being desirable in carrying out the objects of my invention in connection with this phase thereof, to provide this differential or division of pressure between the outer and inner bands. The block 35 is adapted, if desired, to house a take-up device for the clutch bands, but I have not illustrated the construction of this take-up device in detail inasmuch as it does not form a part of this invention and for the purposes hereof may be omitted if desired. Suitable means may be provided for restoring the bands to their normally disengaged positions, shown in Fig. 3, such means being illustrated in the form of a spring 38 normally tending to separate the band ends 18 and 27, so that the associated friction shoes will run free from contact with the drum 14. The guide 22 is provided with stops 39 and 40 for limiting the extreme movements of the band ends, such arrangement being desirable particularly when a take-up device, such as the device 35, is employed.

Before describing the details of the selector mechanism whereby the various toggle levers 31 may be selectively operated under control of the vehicle operator, I will describe the details of that feature of my invention which is directed to the drive and arrangement of my fluid pump. In this connection I have provided a cylinder 41 adapted to receive a piston 42, the latter having a rod 43 extending inwardly of the transmission housing for actuating the various levers 31, as will be presently apparent, cylinder 41 having a vent 44 to permit unrestricted movement of piston 42 inwardly thereof toward the transmission. This cylinder has an opening 45 communicating with pipe or conduit 46 which is alternately a supply pipe for the fluid under pressure and also a return for the fluid. A pipe 46 extends to the valve 47 and is adapted for registration with the ports 48 and 49 of a passage 50 formed in the rotatable valve 47. The passage 50 is adapted to selectively establish communication between conduit 46 and either the fluid supply conduit 51 or the return conduit 52. In Fig. 1 the solid line position of valve passage 50 is shown as establishing a communication between the conduits 46 and 51 and the dotted line position thereof, after suitable rotation of valve 47 has taken place, illustrates the communication between conduits 46 and 52.

Forwardly of the transmission C I have provided a casing D which may be secured to the transmission, this casing being provided with a fluid sump or reservoir 53. Within this reservoir is located the pump 54 which may be of any suitable type, the pump being driven by a shaft 55 supported in a bearing 56 and receiving a drive by reason of the driving and driven worm gears 57 and 58, respectively, the gear 58 being secured to shaft 55 and the driving gear 57 being secured to a sleeve 59. The sleeve 59 freely receives a shaft 60, the latter transmitting the drive from clutch B to transmission C.

In the present embodiment of my invention I have illustrated pump 54 acting on the fluid 61 in reservoir 53, this fluid being in the form of a suitable oil of the proper viscosity. Pump 54 has an intake 62 and a pressure outlet to the conduit 51 aforesaid, a pressure relief controlled by-pass 63 being provided to return any excess pressure produced by the pump back to the reservoir 53. The pressure relief valve is illustrated at 64 with the return pipe between the relief valve and the reservoir.

The sleeve 59 which carries the pump driving gear 57 is driven from clutch B in such a manner that the pump receives the drive whenever engine A is operating. Thus, the drive from the engine is taken by a power output shaft 67 to which is secured the main driving structure or assembly of the clutch, such assembly consisting of portions 68 and 69 coupled together by suitable fasteners 70, this driving structure being connected through fasteners 71 to the engine drive shaft 67. The clutch portion 69 forms the outer driving member of clutch B and for the fluid operating type of clutch illustrated, this member is provided with the well-known fluid conducting vanes 72 cooperating with companion vanes 73 of the driven clutch member 74, the latter being housed by the driving clutch structure. This driven member 73 is secured by fasteners 75 to the flange 76 of the aforesaid shaft 60, the latter having the forwardly extending portion 77 thereof piloted by a bearing 78 within the engine drive shaft 67. The sleeve 59 is keyed or otherwise secured to a collar 79 to which the member 69 of the clutch is secured by fasteners 80. In this manner it will be noted that the engine A delivers its power by shaft 67 to clutch B, the sleeve 59 being driven with the driving structure of the clutch so that the pump 54 is driven directly from the engine and not from the driven member 74 of the clutch. If desired, other forms or types of clutches may be substituted for the fluid fly wheel type illustrated in my drawings, and I do not limit my invention in its broader aspects to the provision of a fluid type of clutch although, as noted hereinbefore, such type of clutch is ordinarily preferred where the transmission C is of the epicyclic or planetary type.

I will next describe the details of construction and operation of my selector mechanism and the manually controlled means for manipulating the selector mechanism in order to selectively couple the respective transmission controlling clutches to the power applying prime mover, the latter being illustrated in the form of the fluid pressure cylinder 41 and cooperating piston 42 referred to hereinbefore.

Arranged longitudinally within transmission C, I have provided a plurality of selector elements 81, 82, 83 and 84 respectively associated with the transmission controlling clutches 10, 11, 12 and 13. Inasmuch as the details of the construction and operation of these selector elements are similar, my description for the most part will be limited to one of these selector elements best shown in Figs. 4 and 6. In Fig. 4, the selector element 82 is illustrated in its position of actuation, this element consisting of a cylindrical body portion or follower 85 formed with the oppositely extending arms 86 and 87, the former being engageable with the notched portion 32 of lever 31 and the latter arm 87 being adapted for engagement with notched portion 88 of a common connecting intermediary or bus bar 89. This bus bar preferably extends longitudinally of the transmission and is pivotally mounted at its opposite ends by reason of the arms 90, best shown in Fig. 1, it being understood that opposite each of the selector elements the bus bar is provided with an actuating arm corresponding to the arm 91 of the element 82 shown in Fig. 4. This arm 91 is provided with a portion 92 adapted for connection with the piston rod 43 through the intermediary of the link 93, a spring 94 associated with each of the bus bar arms being provided to yieldingly urge the bus bar arms to their respective position as shown in Figs. 3 and 6, this spring 94 at the same time restoring the piston 42 to the inoperative position shown in Fig. 3 after the fluid pressure has been relieved from cylinder 41, as will be more apparent hereinafter.

The selector element 82 receives a leader stem 95, the latter extending upwardly through the body portion of the selector element to carry a cam follower 96 formed with a cam face 97 which is arced about the pivot 98 at the bottom of the selector element. The stem 95 is provided with a collar 99 which provides an abutment for a pair of initially compressed coil springs 100 and 101, these springs being housed within the body portion 85. The purpose of these springs is to provide a yielding action between the stem 95 and the selector element 82 associated therewith, the yielding connection permitting actuation of cam follower 96 in advance of movement of the selector element.

The lower end of stem 95 is hollow and receives a guide pin 102 which forms the pivotal support 98 for the selector element. Intermediate the lower end of stem 95 and the pivot 98 is a spring 103 adapted to urge the stem 95 upwardly, springs 100 and 101 cooperating with collar 99 to urge the selector element 82 to follow the movement of stem 95. Thus, the selector body portion 85 is guided by stem 95 but is capable of longitudinal movement independently thereof. Each selector element is yieldingly urged to its normal upright position as shown in Figs. 3 and 6 by reason of a spring 104 acting between the transmission casing and the selector body portion 85, a suitable stop 105 being provided for each selector element in order to limit movement thereof about pivot 98 under the influence of spring 104.

Each selector element is also provided with a forwardly extending blade 106 adapted to swing with the selector element about the pivot 98 so as to position this blade between a pair of adjacent plungers 107 of the safety controlling mechanism illustrated in detail in Figs. 5 and 7. This mechanism consists of a carrier 108 for the plungers 107, these plungers preferably having tapered ends 109 for guiding the blade 106 into position. The plungers are arranged so that it is possible to space any adjacent pair a sufficient distance to receive the blade 106 of any of the selector elements, although it will be noted that when any blade is engaged between a pair of plungers, as shown in Fig. 5, the plungers will prevent the reception of any additional blade and therefore prevent the piston 42 from actuating any of the transmission controlling clutches except the one whose associated selector element has the blade portion 106 thereof engaging the space between the plungers.

The manual selector operating means is best shown in Fig. 1 and consists of a selector handle 110 adapted to move on a pivot 111 in association with a control indicating segment 112 conveniently mounted for operation by the vehicle driver. In Fig. 1 I have shown the selector operating device as mounted on the steering column 113 of the usual steering wheel 114 so that the handle 110 may be conveniently reached and manipulated by the driver of the motor vehicle. The segment 112 is provided with a plurality of stops which preferably bear means for indicating to the operator the respective positions of control for the transmission C. Thus, the stop 115 corresponds to an arm setting for a neutral condition of transmission C, stop 116 being adapted to actuate the transmission controlling clutch 12 for producing first speed or the low driving ratio. Stop 117 which is shown engaged by handle 110 in Fig. 1 represents the transmission control for second speed, Figs. 1, 4 and 5 representing the position of the parts controlled thereby for this speed. In similar manner, stops 118 and 119 are adapted, when arm 110 is selectively moved into engagement therewith, to control manipulation of the corresponding selector elements for controlling the actuation of the transmission controlling clutches 10 and 13 which are respectively the high or third speed and reverse drives through the transmission.

The control handle 110 is adapted to actuate the various selector elements by reason of a suitable connection 120 herein shown in the form of a Bowden wire connected at 121 with the handle and having the other end thereof connected at 122 with a lever 123 of a selector cam shaft 124, the latter being journaled in suitable bearings 125 spaced longitudinally of transmission C so as to overlie the cam followers 96 of the various selector elements. The cam shaft 124 is provided with a plurality of longitudinally spaced cams, these cams being relatively spaced about the axis of the cam shaft so as to correspond to the arcuate spacing of the various stops on the selector segment 112. Thus, the cam shaft is provided with the cams 126, 127, 128 and 129 respectively associated with the selector elements of the transmission controlling clutches 10, 11, 12 and 13.

I have also provided means for controlling actuation of the prime mover which applies power to actuate levers 31, this control means preferably being manually operated. In Fig. 1 this control means is shown in the form of a pedal or manually controlled operating element 130 pivotally mounted on a fixed support 131, the pedal having an arm 132 pivotally connected at 133 to a connecting device or linkage 134. This linkage is pivotally connected at its opposite end 135 to an arm 136 which is suitably connected to valve 47. Thus, when the pedal 130 is operated against the tension of spring 137 to move the pedal to the dotted line position shown in Fig. 1, the arm 136 is partially rotated through linkage 134 so as to position the valve passage 50 in the dotted line position of Fig. 1 in order to place conduits 46 and 52 in communication and thereby relieve the fluid pressure in cylinder 41.

In operation of my transmission device with the parts positioned as shown in Figs. 1, 4, and 5, the vehicle driving shaft 15 is being operated in second speed as determined by the setting of selector handle 110. In this position the selector element 82 has been depressed by cam 127 to align arms 86 and 87 of the selector element with the lever 31 and bus bar arm 91. The pressure outlet conduit 51 being in communication through valve passage 50 with cylinder 41, the piston 42 has, therefore, been actuated by the fluid pressure so as to rock bus bar 89 and selector element 82 to actuate lever 31 and thereby applying a braking effort to drum 11 associated with the second gear speed train of the transmission C. In Fig. 6 the selector element 82 is shown in its inoperative position just prior to actuation of pedal 130 to cause introduction of fluid pressure to cylinder 41, Fig. 4 showing the corresponding position of these parts after piston 42 has applied its power as aforesaid. It will be noted that actuation of selector element 82 of Fig. 4 has also swung the blade 106 associated therewith into the position shown in Fig. 5 so that while this second speed setting of the transmission is maintained, the plungers 107 will prevent actuation of any other selector element from actuating any transmission controlling clutch other than the clutch associated with the second speed.

With the parts positioned as shown in Figs. 1 and 4, let us assume that the vehicle driver desires to manipulate the transmission C for third speed, such manipulation involving the release of control clutch 11 and the actuation of the lever of control clutch 10. The operator first moves the selector handle 110 from the position shown in Fig. 1 to a position opposite stop 118, such movement acting through the Bowden wire 120 to rotate cam shaft 124 sufficiently to swing the third speed selector cam 126 downwardly, such movement swinging the second speed selector cam 127 upwardly away from contact with the cam follower 96 associated therewith. When cam 126 is moved downwardly, the cam follower 96 of the selector element engaged thereby will be depressed so as to further compress spring 101, but the selector element is prevented from moving downwardly by reason of the fact that the arm 91 of bus bar 89 will lie in the path of the arm 87 of the third speed selector element 81. However, when the bus bar is swung to its inoperative position, it will be apparent that the spring 101 will act to move the selector element associated therewith, the third speed element in this instance, so as to position this selector element between the arm 31 of the third speed control clutch 10 and the associated arm 91 of the bus bar, such parts being ready for power actuation by the piston 42.

In order to release bus bar 89 and the second speed selector element, in the foregoing example, the operator manually depresses pedal 130 so as to place cylinder 41 in communication with the return conduit 52, spring 94 then acting to swing bus bar 89 and piston 42 to the position shown in Fig. 6. When pedal 130 has been manipulated as aforesaid, the second speed cam 127 having been swung away from the cam follower 96 associated therewith, spring 103 acts on the stem 95 of the second speed selector element so as to move this stem upwardly. By reason of such upward movement, spring 100 will cause the second speed selector element to follow the movement of the stem 95 thereby positioning arms 86 and 87 upwardly out of contact with the lever 31 and bus bar arm 91 of the second speed mechanism, spring 104 at the same time restoring the second speed selector element 82 to its upright position against stop 105, the selector mechanism of the second speed being thereby restored to a position ready for further manipulation under the control of the operator as will be apparent.

When pedal 130 is released from its aforesaid depressed position, spring 137 will act to restore the pedal to the full line position of Fig. 1, thereby again actuating valve 47 to place cylinder 41 in communication with the pressure conduit 51 from pump 54. Thus, by the time the selector mechanism associated with the second speed control clutch 11 is restored to its inoperative position, the piston 42 is again actuated under power to rock the selector element 81 of the third speed control clutch 10, it being understood that such actuation is effected through the common bus bar and lever 31 of the control clutch 10 in a manner similar to the actuation of these corresponding parts for the second speed clutch 11 described above. From the foregoing illustration of the manner in which the selector mechanism may be actuated to place the transmission in third speed from its second speed condition, it will be readily apparent that the selector mechanisms of other driving ratios or the neutral position may be readily accomplished by manual adjustment of handle 110 followed by actuation of pedal 130. Thus, the control handle 110 is first operated by the vehicle driver into the desired position corresponding to the transmission gear ratio which is desired, the operator thereafter depressing pedal 130 in order to clear the bus bar of any selector element engaged at that time. On release of pedal 130 the selector element, previously manipulated by control handle 110 and moved into operative condition when the pedal was depressed as aforesaid, will thereby be in position for actuation by the power stroke of piston 42.

While I have illustrated my gear selecting and control device in connection with a transmission of the epicyclic type, I desire to point out that I do not limit my invention in its broader aspects to this particular type of transmission since other forms of transmissions may embody the principles of my invention if desired. Likewise various changes and modifications may be made throughout my power transmission and within the scope of the appended claims, and it is not my intention to limit my invention to the particular combination and arrangement of parts shown and described herein for illustrative purposes.

What I claim is:

1. In a braking mechanism, a rotatable drum, a plurality of substantially semi-circular bands, shoes respectively associated with said bands for engagement with said drum, one of said shoes being substantially semi-circular and the other being substantially circular, means for anchoring said bands, and means for actuating said bands, said actuating means applying a differential of force to said bands whereby to substantially equalize the braking effort applied to said drum.

2. In a braking mechanism of the character described, a rotatable drum, an outer band substantially surrounding said drum to provide substantially adjacent ends thereof, means for anchoring one of said ends of said outer band, a segmental shoe carried by a portion of said outer band adjacent the anchored end thereof adapted for engagement with said drum, a segmental band within said outer band and having an actuating end located substantially adjacent the other of said ends of the outer band, a second segmental shoe carried by said segmental band for engagement with said drum, means for anchoring said segmental band intermediate the length of said outer band, means for simultaneously actuating the adjacent ends of said outer band and said segmental band to bring the shoes associated therewith respectively into engagement with said drum.

3. In a braking mechanism of the character described, a rotatable drum, an outer band substantially surrounding said drum to provide substantially adjacent ends thereof, means for anchoring one of said ends of said outer band, a segmental shoe carried by a portion of said outer band adjacent the anchored end thereof adapted for engagement with said drum, a segmental band within said outer band and having an actuating end located substantially adjacent the other of said ends of the outer band, a second segmental shoe carried by said segmental band for engagement with said drum, means for anchoring said segmental band intermediate the length of said outer band, means for simultaneously actuating the adjacent ends of said outer band and said segmental band to bring the shoes associated therewith respectively into engagement with said drum, said actuating means dividing the brake applying force thereof so as to favor the last said end of the outer band more than the actuated end of said segmental band.

4. In a power transmitting device of the type having a speed changing transmission driven by a prime mover, a clutch having driving and driven members respectively operably connected to said prime mover and to said transmission, a shaft driven by said driven clutch member and adapted to drive said transmission, a driving member located intermediate said driven clutch member and said transmission, said driving member being concentric with said driven shaft and driven with said driving clutch member independently of said driven shaft, fluid pressure operating means for selectively manipulating the speed changes of said transmission, a fluid pump adapted to supply fluid under pressure to said operating means, and means for driving said pump from said driving member.

5. In a power transmitting device of the type having a speed changing transmission driven by a prime mover, a fluid operated clutch having driving and driven members respectively operably connected to said prime mover and to said transmission, said driving clutch member having a rotatable casing structure intermediate said driven clutch member and said transmission, fluid pressure operating means for selectively manipulating the speed changes of said transmission, a fluid pump adapted to supply fluid under pressure to said operating means, and means for driving said pump from said casing structure independently of said clutch driven member.

6. In a power transmitting mechanism including an engine and a speed changing transmission, a clutch having a driving member connected for operation by said engine and a driven member intermediate said engine and clutch driving member connected for operating said transmission, fluid pressure operating means for selectively manipulating the speed changes of said transmission, a fluid pump adapted to supply fluid under pressure to said operating means, and means for driving said pump with said clutch driving member rearwardly of said clutch driven member and independently of said clutch driven member.

7. In a power transmitting device of the type having a speed changing transmission driven by a prime mover, a clutch having a driving member operably connected to said prime mover and a driven member, a shaft connected to said clutch driven member and adapted to drive said transmission, fluid pressure operating means for selectively manipulating the speed changes of said transmission, a fluid pump adapted to supply fluid under pressure to said operating means, a sleeve driven by said clutch driving member and surrounding said shaft, said clutch driven member being positioned intermediate said prime mover and said sleeve, and means for driving said pump from said sleeve.

8. In a power transmission of the character described including an engine and change speed transmission associated therewith, a fluid clutch intermediate the engine and transmission, fluid pressure operated means for manipulating said transmission, said clutch comprising outer and inner clutch vane members respectively connected to said engine and transmission, said connection to said transmission including a shaft extending through said outer vane member, a fluid pump, means for conducting fluid under pressure from said pump to said fluid pressure operated means and means intermediate said clutch and transmission for driving said pump from said outer vane member.

9. In a power transmission of the character described including an engine and change speed transmission associated therewith, a fluid clutch intermediate the engine and transmission, said clutch comprising outer and inner clutch vane members respectively connected to said engine and transmission, said connection to said transmission including a shaft extending through said outer vane member, a pump, and means intermediate said clutch and transmission for driving said pump from said outer vane member, said driving means including a sleeve surrounding said shaft and a second shaft drivingly connecting said sleeve and pump.

10. In a change speed transmission, transmission elements adapted for actuation to change the speed ratio of the transmission, means associated with each of said transmission elements for actuating said elements, a plurality of selector elements movable relatively to each other to a position for operating said actuating means, manually controlled means for selectively moving said selector elements independently of one another into said operating position, power applying means for operating said selector elements when the latter are in said operating position, and means associated with one of said selector elements for moving same into its operative position subsequent to actuation thereof by said manually controlled means and in response to movement of said power applying means toward the inoperative position thereof.

11. In a change speed planetary gear transmission, a plurality of planetary gear train controlling brakes each having a brake operator connected therewith, manually controlled selector means including a plurality of selector elements movable to respectively engage and thrust on said brake operators for controlling speed ratios of the transmission, said manually controlled means further including a single manually operably selector member movable to a plurality of stations of transmission control for selectively operating said selector elements, a prime mover for effecting changes in said transmission speed ratios in response to actuation of said selector means, means controlling the actuation of said prime mover, and means for mounting said selector elements for reciprocatory and oscillatory movements so constructed and arranged that said selector elements have at least one of said movements relatively to each other.

12. In a braking mechanism of the character described, a rotatable drum, arcuate concentric braking devices adapted for engagement with said drum, means for anchoring one end of said braking devices, said braking devices having load receiving ends adjacent each other, said braking devices extending in the same circumferential direction from said load receiving ends, and means for simultaneously actuating said adjacent load receiving ends to engage said braking devices with said drum.

13. In a braking mechanism of the character described, a rotatable drum, arcuate concentric braking devices adapted for engagement with said drum, means for anchoring one end of said braking devices, said anchoring means being substantially diametrically opposed, said braking devices having load receiving ends adjacent each other, said braking devices extending in the same circumferential direction from said load receiving ends, and means for simultaneously actuating said adjacent load receiving ends to engage said braking devices with said drum.

14. In a braking mechanism for a planetary transmission, a rotatable drum, an outer contractile band extending approximately around the outer surface of said drum, means for anchoring one end of said outer band, means for actuating the other end of said outer band to effect braking of said drum, and a pair of approximately semi-circular friction members intermediate said drum and outer band and adapted to engage said drum, and means for anchoring one of said friction members approximately diametrically opposite the anchor for said outer band.

15. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, and power operating means for said common operating member.

16. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, and a prime mover for operating said common operating member.

17. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, a prime mover for operating said common operating member, and manually operable means for controlling the operation of said prime mover.

18. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, and a fluid pressure operating device for said common operating member.

19. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, a fluid pressure operator for said common operating member, and manually controlled valve means for controlling a fluid pressure supply to said fluid pressure operator.

20. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, and power operating means for said common operating member, each of said selector elements including spring actuated leader and follower parts thereof providing for preselective setting of said selector elements in advance of a change in the transmission speed ratio drive.

21. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, power operating means for said common operating member, and means for pivotally mounting each of said selector elements for swinging movement thereof by said common operating member.

22. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, manually operable selector means including a plurality of selector elements adapted respectively for movement independently of said common operating member whereby to operably connect said common operating member with one of said brake actuating members, means for operating said common operating member under power, said manually operable means including yieldingly connected leader and follower members providing for preselective setting of said selector elements.

23. In a planetary transmission having a plurality of planetary gear sets and associated rotary control members, braking means for each of said rotary members adapted for selective operation to vary the speed ratio drive through the transmission, an actuating member operably connected to each of said braking means, a common operating member, a plurality of manually controlled selector elements adapted respectively for movement independently of said common operating member from an inoperative position to an operative position between said common operating member and one of said brake actuating members, power operating means for said common operating member, and means for pivotally mounting said common operating member for swinging movement between said power operating means and said selector elements.

24. In a planetary transmission having a plurality of planetary gear sets and associated rotary control members, braking means for each of said rotary members adapted for selective operation to vary the speed ratio drive through the transmission, a common actuating member adapted to transmit braking force selectively to each of said braking means, manually controlled preselector means for manipulating said transmission in advance of a change in the speed ratio drive thereof, and fluid pressure operating means for operating said common actuating members.

25. In a planetary transmission having a plurality of planetary gear sets and associated rotary control members, braking means for each of said rotary members adapted for selective operation to vary the speed ratio drive through the transmission, an actuating member operably connected to each of said braking means, manually controlled selector means for setting said transmission for speed ratio changes, a fluid pressure operated piston, means including a common brake force transmitting element actuated by said piston for operating said brake actuating members selectively under control of said selector means, and means for controlling fluid pressure supply to said piston.

26. In a planetary transmission having a plurality of planetary gear sets and associated rotary control members, braking means for each of said rotary members adapted for selective operation to vary the speed ratio drive through the transmission, an actuating member operably connected to each of said braking means, manually controlled selector means for setting said transmission for speed ratio changes, a fluid pressure operated piston, means including a common brake force transmitting element actuated by said piston for operating said brake actuating members selectively under control of said selector means, a pump for supplying a fluid under pressure to said piston, a valve controlling the fluid supply from said pump to said piston, and manually controlled means for operating said valve.

27. In a planetary transmission having a plurality of planetary gear sets and associated rotary control members, braking means for each of said rotary members adapted for selective operation to vary the speed ratio drive through the transmission, an actuating member operably connected to each of said braking means, manually controlled selector means for setting said transmission for speed ratio changes, a fluid pressure operated piston, means actuated by said piston for operating said brake actuating members selectively under control of said selector means, and means for controlling fluid pressure supply to said piston subsequently to a setting of the transmission by said manually controlled selector means for changing the transmission gear ratio.

28. In a transmission, a plurality of selectively movable elements adapted to vary the transmission speed ratio, manually controlled operating means for selectively moving said elements, and safety means preventing selective movement of more than one of said elements at a time, said safety means including a plurality of members movable to selectively provide a predetermined space between pairs of adjacent members, said safety means further including means carried by each of said elements and movable therewith to engage pairs of adjacent members to selectively provide and occupy said space, said space accommodating only one of said element carrying means at a time.

29. In a planetary transmission having a plurality of planetary gear sets and associated rotary control members, braking means for each of said rotary members adapted for selective operation to vary the speed ratio drive through the transmission, an actuating member operably connected to each of said braking means, means for selectively operating said brake actuating members and including a reciprocating member operably associated with each of said brake actuating members, and safety means for preventing selective operation of more than one of said brake actuating members at a time, said safety means including a plurality of elements arranged in a row and being movable to selectively provide a predetermined space between pairs of adjacent elements, said reciprocating members being adapted when operated to selectively engage pairs of adjacent elements to provide and occupy said space, said space accommodating only one of said elements at a time.

30. In a change speed transmission, manually controlled selector means including a plurality of selector elements for respectively controlling speed ratios of the transmission, a prime mover for effecting changes in said transmission speed ratios in response to actuation of said selector means, means controlling the actuation of said prime mover, and means for separately mounting said selector elements for reciprocatory and oscillatory movements relatively to each other.

31. In a change speed transmission, transmission elements adapted for actuation to change the speed ratio of the transmission, means associated with each of said transmission elements for actuating said elements, a plurality of selector elements movable relatively to and independently of each other to positions for operating said actuating means, manually controlled means for selectively moving said selector elements into said operating position, power applying means for operating said selector elements when the latter are in said operating position, and means associated with each of said selector elements for moving same into its operative position subsequent to actuation thereof by said manually controlled means and in response to movement of said power applying means toward the inoperative position thereof.

32. In a planetary transmission having a plurality of planetary gear sets and associated rotary control members, braking means for each of said rotary members adapted for selective operation to vary the speed ratio drive through the transmission, a common actuating member adapted to transmit braking force selectively to each of said braking means, manually controlled selector means for manipulating said transmission, fluid pressure operating means for operating said common actuating member, and means for guiding said common actuating member for oscillatory movement.

33. In a planetary transmission having a plurality of planetary gear sets and associated rotary control members, braking means for each of said rotary members adapted for selective operation to vary the speed ratio drive through the transmission, a common actuating member adapted to transmit braking force selectively to each of said braking means, manually controlled selector means for manipulating said transmission, fluid pressure operating means for operating said common actuating member, and means for guiding said common actuating member for swinging movement.

34. In a planetary transmission having a plurality of planetary gear sets and associated rotary control members, braking means for each of said members adapted for selective operation to vary the speed ratio drive through the transmission, a common actuating member adapted to transmit braking force selectively to each of said braking means, manually controlled selector means for controlling the selective actuation of said common actuating member, and a fluid pressure operator having a piston adapted for reciprocatory movement, and means for directly operably connecting said piston with said common actuating member.

35. In a planetary transmission having a plurality of planetary gear sets and associated rotary control members, braking means for each of said members adapted for selective operation to vary the speed ratio drive through the transmission, a common actuating member adapted to transmit braking force selectively to each of said braking means, manually controlled selector means for controlling the selective actuation of said common actuating member, a fluid pressure operator having a piston adapted for reciprocatory movement, means for directly operably connecting said piston with said common actuating member for moving said common actuating member in one of its directions of reciprocatory movement, and a spring for moving said piston in the other of its said directions of movement.

36. In a planetary transmission having a plurality of planetary gear sets and associated rotary control members, braking means for each of said members adapted for selective operation to vary the speed ratio drive through the transmission, a common actuating member adapted to transmit braking force selectively to each of said braking means, a fluid pressure operated piston adapted for reciprocatory movement, means for operably connecting said piston to said common actuating member, a reservoir for storing fluid, a pump for supplying fluid under pressure from said reservoir to said piston, valving means between said pump and piston, and manually operable controlling means for controlling the selective actuation of said common actuating member and for operating said valving means.

37. In a planetary transmission having a plurality of planetary gear sets and associated rotary control members, a plurality of means respectively frictionally engageable with said rotary control members and adapted for selective operation to vary the speed ratio drive through the transmission, a common actuating member movable for transmitting an operating force selectively to said plurality of frictionally engageable means, a piston for operating said common actuating member in its force applying direction, manually controlled means for supplying fluid under pressure to said piston, and a spring operably associated with said piston and common actuating member for simultaneously returning said piston and moving said common actuating member to a position preparatory to said force transmitting movement thereof.

38. In a planetary transmission having a plurality of planetary gear sets and associated rotary control members, a plurality of means respectively frictionally engageable with said rotary control members and adapted for selective operation to vary the speed ratio drive through the transmission, a common actuating member movable for transmitting an operating force selectively to said plurality of frictionally engageable means, a plurality of relatively movable selector operating elements adapted to selectively provide operating connections between said common actuating member and said plurality of frictionally engageable means, a piston for operating said common actuating member in its force applying direction, valving means controlling communication between a source of fluid under pressure and said piston, and manually operable controlling means for controlling relative movement of said selector operating elements to selectively establish said operating connections and for operating said valving means, said manually operable means including a manually adjustable selector member movable to a plurality of stations of transmission control.

HERBERT F. PATTERSON.